United States Patent [19]

Kitajima et al.

[11] Patent Number: 5,015,081
[45] Date of Patent: May 14, 1991

[54] BINOCULAR MICROSCOPE

[75] Inventors: Nobuaki Kitajima; Kazutoshi Takagi, both of Tokyo, Japan

[73] Assignee: Tokyo Kogaku Kikai Kabushiki Kaisha, Japan

[21] Appl. No.: 449,052

[22] Filed: Dec. 14, 1989

Related U.S. Application Data

[63] Continuation of Ser. No. 251,592, Sep. 30, 1988, abandoned.

[30] Foreign Application Priority Data

Sep. 30, 1987 [JP] Japan ................. 62-245973

[51] Int. Cl.⁵ ............................................ G02B 21/20
[52] U.S. Cl. .................................... 350/514; 350/519; 350/525
[58] Field of Search ............... 350/514, 516, 518, 520, 350/522, 517, 519, 525

[56] References Cited

U.S. PATENT DOCUMENTS

| | | | |
|---|---|---|---|
| 2,439,526 | 4/1948 | Ott | 350/522 |
| 4,175,826 | 11/1979 | Blaha et al. | 350/522 |
| 4,299,439 | 11/1981 | Stromblad | 350/522 |
| 4,412,727 | 11/1983 | Taira | 350/522 |
| 4,512,640 | 4/1985 | Nihoshi | 350/520 |
| 4,548,481 | 10/1985 | Yamada | 350/518 |
| 4,678,291 | 7/1987 | Nyman et al. | 350/520 |
| 4,702,570 | 10/1987 | Yoshino et al. | 350/522 |
| 4,705,367 | 11/1987 | Eckbreth et al. | 350/518 |
| 4,717,246 | 1/1988 | Fehr et al. | 350/520 |
| 4,798,451 | 1/1989 | Fujiwara | 350/514 |

OTHER PUBLICATIONS

Jenkins et al., "The Effects of Stops," Chapter 7, *Fundamentals of Optics*, Third Edition, Tokyo, Kogakusha Company, Ltd., pp. 98 to 105, no date.

Primary Examiner—Bruce Y. Arnold
Assistant Examiner—Martin Lerner
Attorney, Agent, or Firm—Finnegan, Henderson, Farabow, Garrett & Dunner

[57] ABSTRACT

A binocular microscope has an objective optical system for receiving a beam of rays from an object and emitting it as a parallel pencil of rays, a relay optical system for relaying the beam of rays coming from the objective optical system, and an ocular for receiving the beam of rays coming from the relay optical system. The binocular microscope is characterized in that the objective optical system is stored in a stationary housing portion, the relay optical system and the ocular optical system are stored in a movable housing portion disposed on the stationary housing portion, and there is provided means for moving the movable housing portion with respect to the stationary housing portion within a predetermined range in a plane perpendicular to an optical axis of the objective optical system stored in the stationary housing portion.

9 Claims, 10 Drawing Sheets

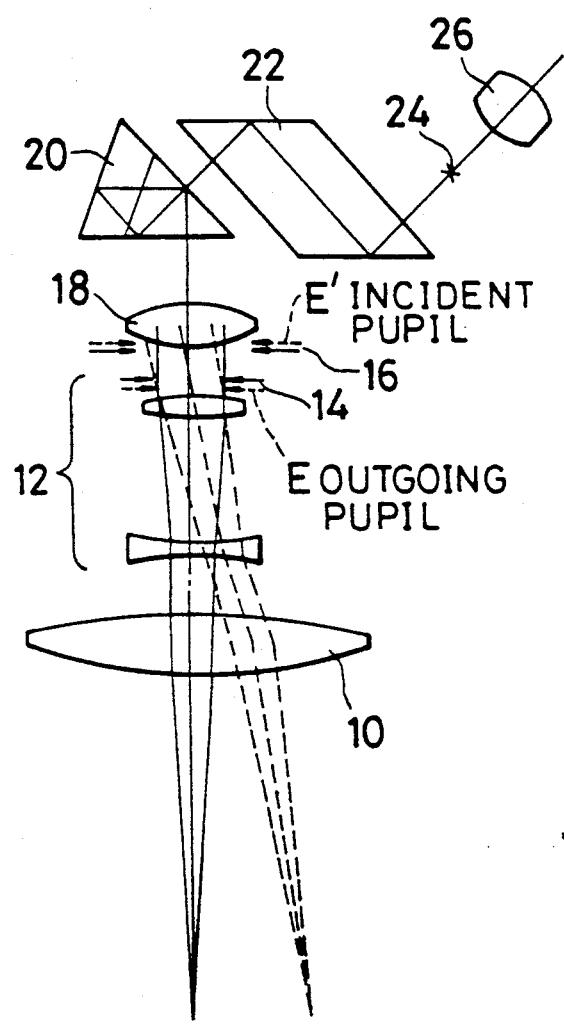
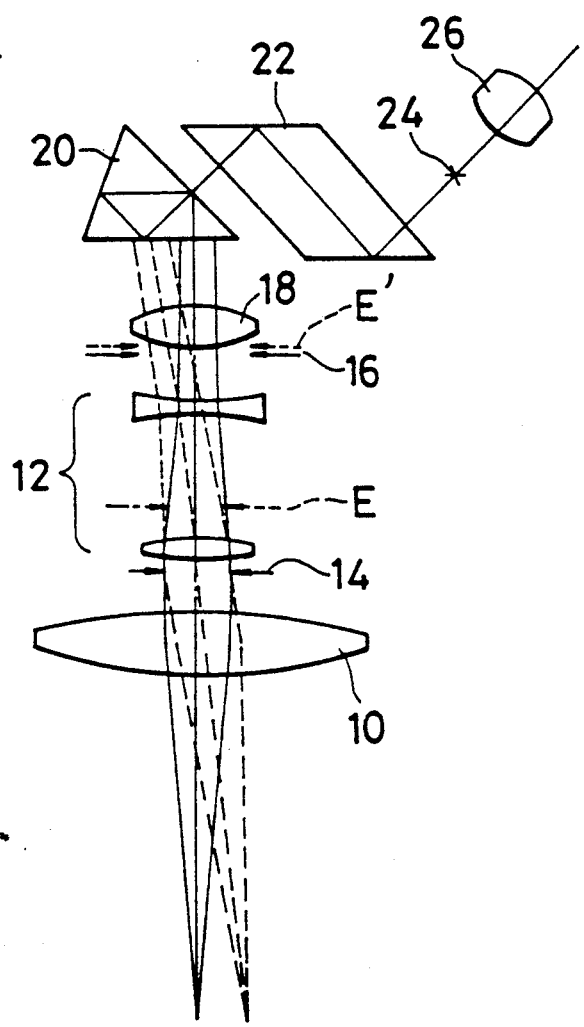

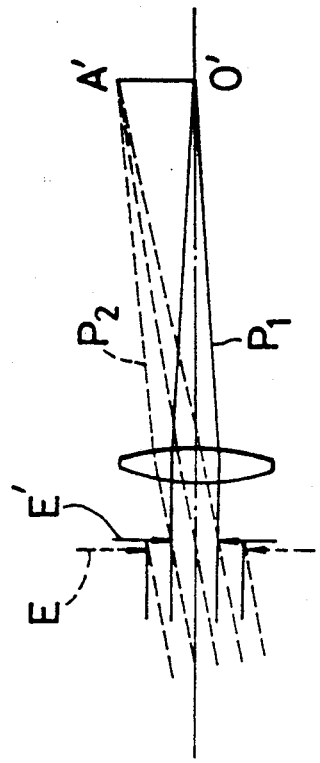
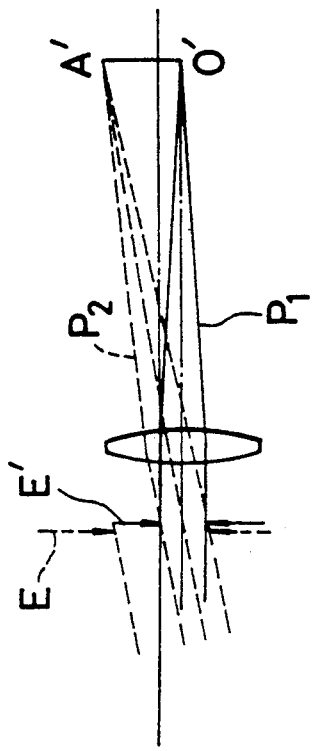
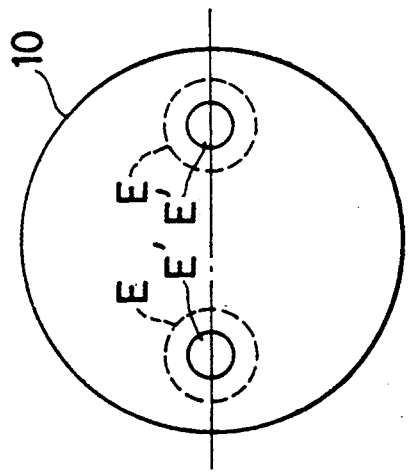
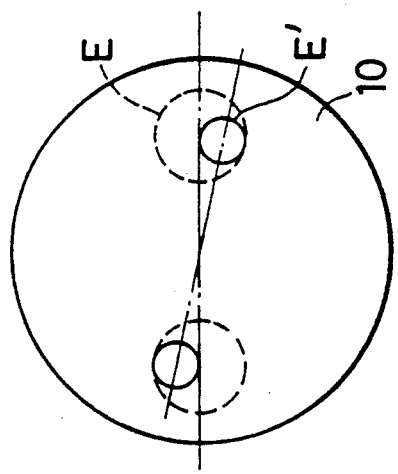

BINOCULAR MICROSCOPE

BACKGROUND OF THE INVENTION

1. Field of the Invention

This application is a continuation of application Ser. No. 251,592, filed Sept. 30, 1988, now abandoned.

This invention relates to a binocular microscope in which the observing direction by an observer (hereinafter simply referred to as the "observing direction") can be changed.

2. Prior Art

Heretofore, a binocular microscope has been used as an operation microscope.

The conventional operation microscope comprises a leg portion, a supporting post secured to the leg portion, a universal arm portion for vertically reciprocally moving the supporting post, and a mirror portion comprising a microscope and an illuminating device which are mounted on the foremost end of the universal arm.

The mirror portion is rotatably mounted on the universal arm portion. Therefore, when the observer wants to change the observing direction, the whole mirror portion is rotated with respect to the universal arm.

In some other cases, a microscope for the use of an assistant (hereinafter simply referred to as the "assistant microscope") is rotatably mounted on a lens-barrel portion of a microscope for the use of an operator (hereinafter simply referred to as the "operator microscope").

When the assistant, who uses the assistant microscope, wants to change the observing direction, he is required to rotate the whole assistant microscope with respect to the operator microscope.

In the conventional operation microscope, the whole mirror portion is required to be rotated in order to change the observing direction of the operator microscope.

This rotating operation is bothersome because the illuminating device and photographing camera mounted on the mirror portion and, when employed, the assistant microscope mounted to the lens-barrel of the operator microscope, etc. must all be moved. In the event the observing direction of the operator microscope is required to be greatly changed, some kind of such troublesome operation must be endured. However, the story is different if such troublesome operation is always accompanied even when only a minor change of the observing direction is required. This naturally prevents the smooth and efficient work of the operator.

Furthermore, in the event the assistant microscope mounted on the lens-barrel of the operator microscope is employed, the operator and the assistant may interfere with each other. Therefore, the mounting position of the assistant microscope must be changed as such that the operator can carry out his operating work without interference.

In the event the assistant microscope employed is of the type entirely independent of the operator microscope, there arises the problem in that the view axis of the operator microscope is not in alignment with that of the assistant microscope.

In view of the above, there has also been proposed an operation microscope in which an assistant microscope receives a part of a beam of rays coming from an objective lens of an operator microscope through an optical member such as a half mirror, so that the view axis of the assistant microscope will be in alignment with that of the operator microscope.

However, it is difficult to obtain a stereoscopic and bright image in such conventional operation microscope as just mentioned.

SUMMARY OF THE INVENTION

It is therefore an object of the present invention to provide a binocular microscope in which the observing direction of an operator can be changed without rotating the whole mirror.

Another object of the present invention is to provide a binocular microscope in which a bright and stereoscopic observing image can be obtained even when the observing direction of the observer is changed.

The feature of the present invention is in that an objective optical system is stored in a stationary housing portion;

a relay optical system and an ocular optical system are stored in a movable housing portion disposed on the stationary housing portion; and there is provided means for moving the movable housing portion with respect to the stationary housing portion within a predetermined range in a plane perpendicular to an optical axis of the objective optical system stored in the stationary housing portion.

Another feature of the present invention is that the radius of an outgoing pupil of a stationary housing portion is larger than that of an incident pupil of a movable housing portion so that a large portion of the light rays passing through the incident pupil of the movable housing portion, which forms the image within a movable range of the movable housing, will pass through the outgoing pupil of the stationary housing portion.

A further feature of the present invention is that the radius of a movable housing is larger than that of a stationary housing portion so that a large portion of the light rays passing through an outgoing pupil of the stationary housing, which light rays contribute to form an image within a movable range of the movable housing portion, will pass through an incident pupil of the movable housing portion.

A still further feature of the present invention is that an outgoing pupil of a stationary housing portion and an incident pupil of a movable housing portion are spaced from one another.

A further feature of the present invention is that the movable range of a movable housing portion is limited such that a large portion of the light rays passing through an outgoing pupil of a stationary housing portion will pass through an incident pupil of the movable housing portion.

An additional feature of the present invention is that an objective optical system includes a variable power optical system, and an outgoing pupil of a stationary housing portion and an incident pupil of a movable housing portion are configured such that a large portion of the light rays passing through the outgoing pupil which contribute to forming an image will enter the incident pupil at any power.

BRIEF DESCRIPTION OF THE DRAWINGS

FIGS. 4(a)-4(b) are schematic illustrations showing a variation in power in an optical system.

FIGS. 9(a)-9(d) illustrate the state of beam a rays when an outgoing pupil at the side of a stationary housing is larger than an incident pupil E' at the side of a movable housing and when the outgoing pupil E is proximate to the incident pupil E';

DETAILED DESCRIPTION OF THE EMBODIMENT

Figure 1:
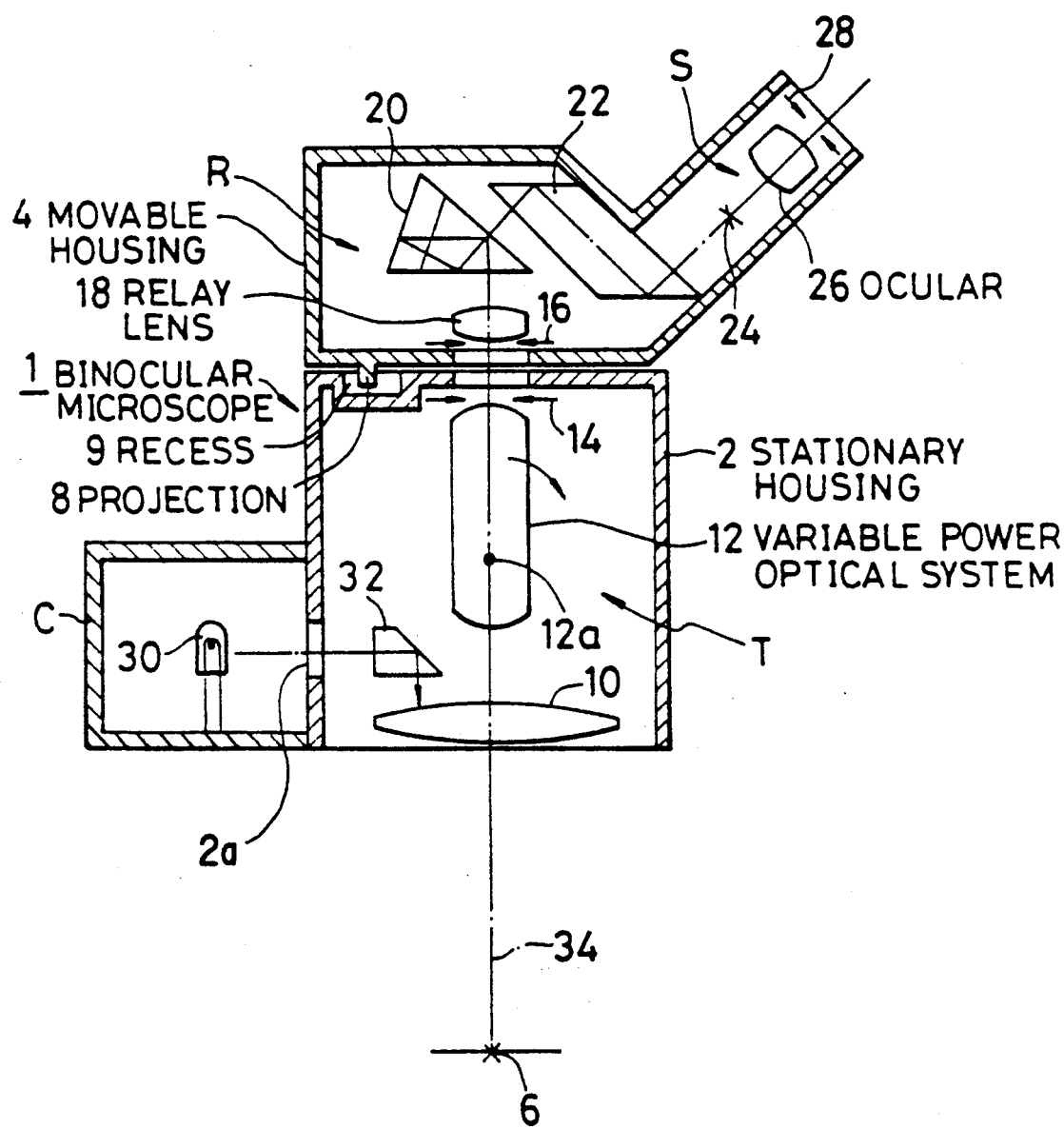
FIG. 1 is a schematic view showing the configuration of a binocular microscope in which the present invention is incorporated.

The configuration of a binocular microscope in which the present invention is incorporated will be described hereunder with reference to FIGS. 1 through 3.

A box-like body of a binocular microscope 1 comprises a stationary housing 2 and a movable housing 4 rotatably disposed on an upper surface of the stationary housing.

The stationary housing 2 is provided therein with an objective optical system T.

The objective optical system T comprises an objective lens 10 and a pair of variable power optical systems 12 for the use of both right and left eyes and a pair of stationary housing aperture diaphragms 14. An illuminating light source 30 is disposed within a casing C which is disposed at the outside of the stationary housing 2. Illuminating light emitted by the illuminating light source 30 is introduced into the stationary housing 2 through an aperture 2a which is formed in the stationary housing 2. An illuminating prism 32 is disposed within the stationary housing 2. The illuminating prism 32 is adapted to guide the illuminating light, which has been introduced into the stationary housing 2, to an object 6 through the objective lens 10 so that the illuminating light will illuminate the object.

The objective lens 10, the illuminating prism 32, the stationary housing aperture diaphragms 14, etc. are secured to the interior of the stationary housing 2 by a supporting member not illustrated. The variable power optical system 12 is held within the stationary housing 2 by a holding member "not illustrated" such that the system 12 can rotate about a rotating axis 12a which is perpendicular to an optical axis 34.

On the other hand, a relay optical system R and an ocular optical system S are disposed within the movable housing 4. The relay optical system R comprises a pair of movable housing aperture diaphragms 16 for the use of the right and left eyes, a pair of relay lenses 18, a roof prism 20 and a diamond-shaped prism 22. An ocular optical system S comprises a reticle 24 and an ocular 26. The movable housing aperture diaphragms 16, relay lenses 18, roof prism 20, diamond-shaped prism 22, reticle 24, and ocular 26 are secured to the interior of the movable housing 4 by supporting members "not illustrated".

The binocular microscope 1 is designed as such that the object 6 can be stereoscopically observed through the pair of oculars 26 along a pair of optical axes 34 which are disposed at predetermined angles.

Figure 2:
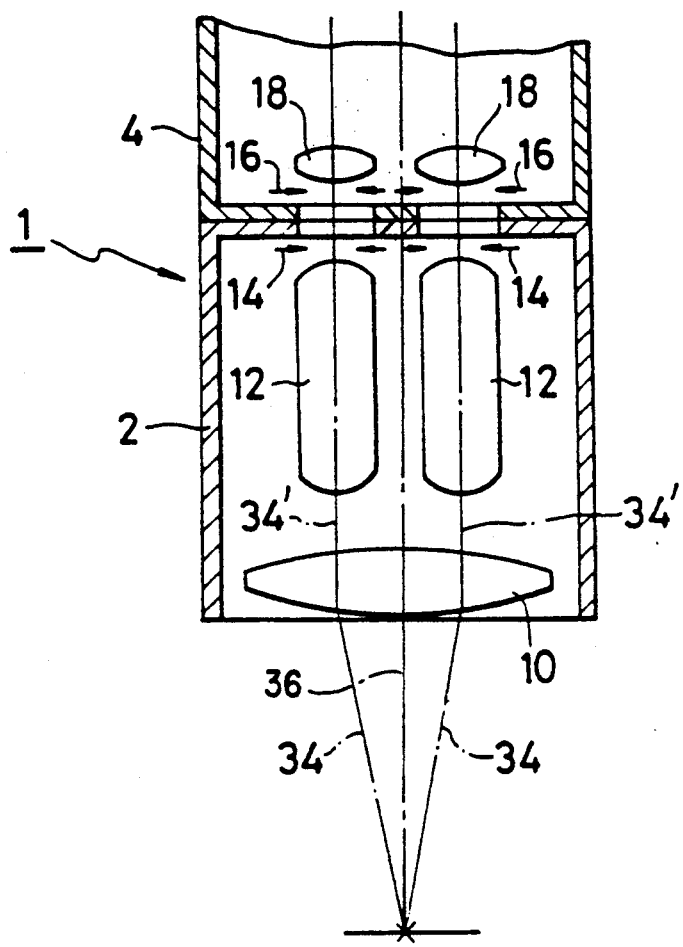
FIG. 2 is a schematic view showing a part of the configuration of the binocular microscope of FIG. 1 direction.
Figure 3:
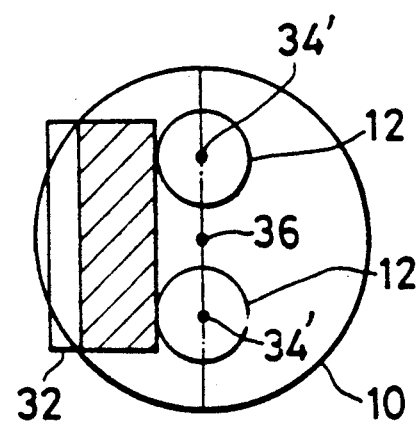
FIG. 3 is a schematic view showing the arrangement of optical systems of an objective optical system in the binocular microscope of FIG. 1 but when viewed from the above.

With reference to FIGS. 2 and 3, the movable housing 4 is rotatably mounted on the stationary housing 2 as such that the housing 4 can rotate about a center line 36 disposed between the optical axes 34' of the right and left optical systems. As shown in FIG. 1, the stationary housing 2 is provided at its upper surface with a guiding member of an arcuate shape encircled about the center line 36 and at its bottom surface with an engaging portion for engaging with the guiding member. In this case, the guiding member and the engaging portion serve as moving means. Furthermore, the stationary housing 2 is formed at its upper surface with a recess 9 and at its bottom surface with a projection 8 for engaging in the recess 8. Due to the foregoing arrangement, the rotating range of the movable housing 4 is restricted.

It is noted that the pair of variable power lens systems 12 are rotatable about the rotating axis 12a which is perpendicular to the optical axes 34' and that if it is rotated by 180° from the illustrated state, the power for observation is varied.

FIGS. 4(a)-4(b) illustrates the state of a beam of rays when the power has been varied.

In FIG. 4(a) where the power is low, the movable housing aperture diaphragm 16 is coincident with the incident pupil E' and the stationary housing aperture diaphragm 14 is coincident with the outgoing pupil E of the stationary housing 2.

If the variable power optical system 12 is rotated by 180° here, it is brought to be in the state as shown in FIG. 4(b) where the power is high.

Since the stationary housing aperture diaphragm 14 is moved to the side of the objective lens 10 at this time, the outgoing pupil E at the side of the stationary housing 2 is formed at a position away from the incident pupil E' at the side of the movable housing 4 as shown in the figure.

The variable power optical system and the relay lenses 18 constitute a so-called afocal optical system (object images spaced by a distance substantially equal to 00 are in conjugate relation), and the beam of rays emitted by the variable power optical system 12 becomes a parallel pencil of rays whether the power is low or high and made incident to the relay lenses 18.

In this way, the reason why the variable power optical system 12 and the relay lenses 18 are formed by the afocal optical system will be explained with reference to FIGS. 5 through 7.

Figure 5C:
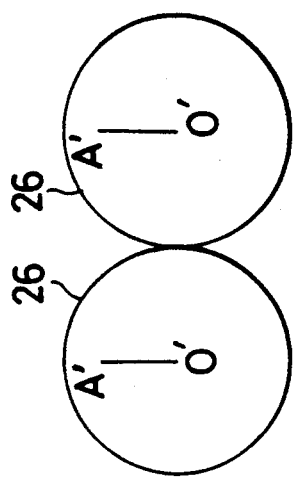
FIGS. 5(a)-5(c) illustrate the state of a beam of rays and corresponding observing images when a movable housing is not rotated, with respect to a stationary housing.
Figure 5B:
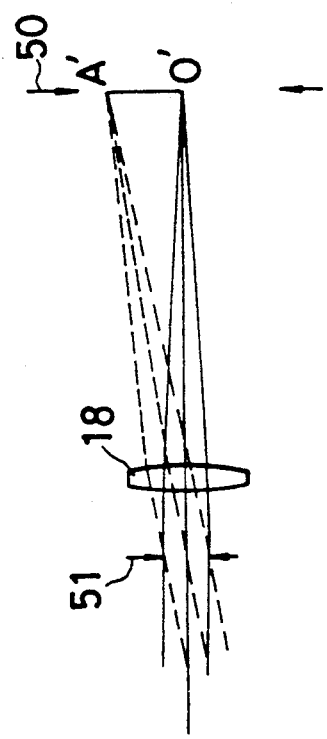
Figure 5A:
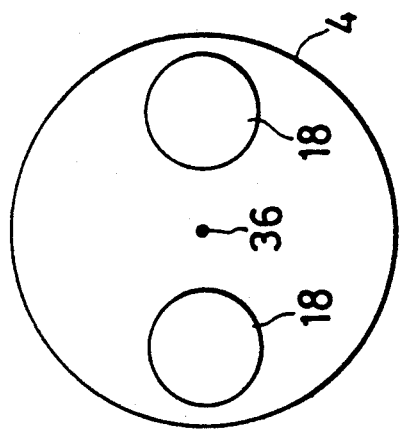

FIGS. 5(a)-5(c) illustrate the states where the movable housing 4 is not rotated with respect to the stationary housing 2. FIG. 5(a) shows the positions of the relay lenses 18 of the movable housing 4, FIG. 5(b) shows the state of beam of rays from the relay lenses 18 to the imaging position at this time, and FIG. 5(c) shows images which can be observed through the oculars 26. In this embodiment, 50 denotes a view field diaphragm and 51 denotes an outgoing pupil at the side of the stationary housing. As apparent from FIG. 5(b), the beam of rays are in the form of a parallel pencil of rays at the object side (left side in the figure) of the relay lens 18, and a variable power lens system "not illustrated" and an afocal optical system are formed. On the other hand, the beam of rays become a converging beam of rays at the image side (right side in the figure) of the relay lens 18, thereby to form images A' and O'.

Figure 6C:
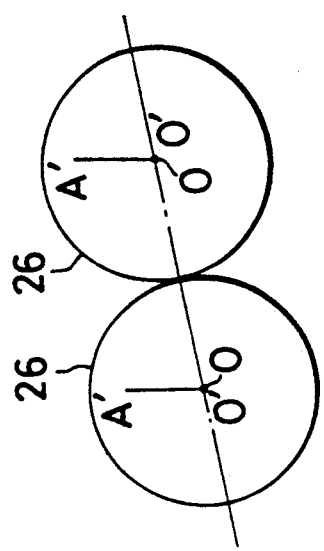
FIGS. 6(a)-6(c) illustrate the state of a beam of rays and observing images when a movable housing is rotated with respect to a stationary housing about a rotating plane perpendicular to the parallel bundle of rays on the inlet side of the relay lens.
Figure 6B:
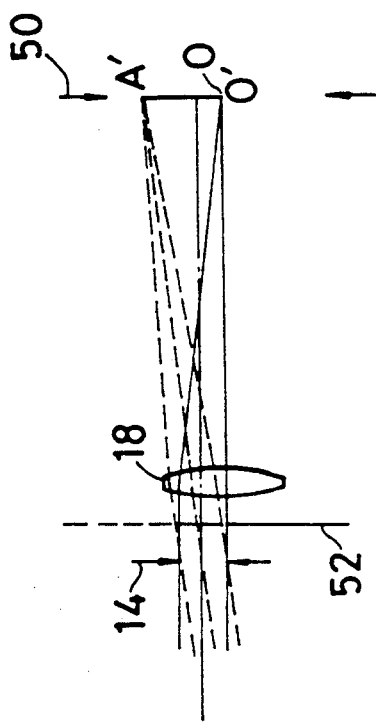
Figure 6A:
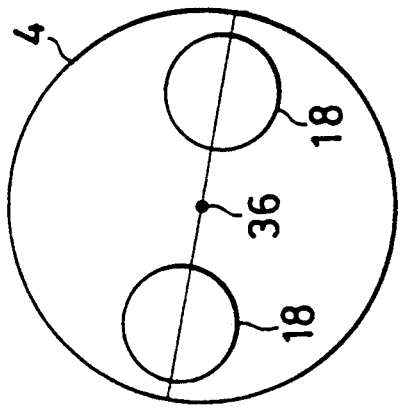

FIGS. 6(a)-6(c) illustrate the state where the movable housing is rotated about the center line 36 with the position of the parallel pencil of rays at the object side of the relay lens 18 as in the case with the binocular microscope.

FIG. 6(a) shows the position where the relay lenses 18 of the movable housing 4 are rotated, FIG. 6(b) shows the position of a rotating plane 52 at this time and the state of the beam of rays from the relay lens 18 to the positions of the images, and FIG. 6(c) shows images which can be observed through the oculars 26. As apparent from FIGS. 6(b) and 6(c), even when the movable housing 4 is rotated and the position of the relay lens 18 is moved with respect to the stationary housing 2, the extension of the beam of rays passing through the center of the relay lens 18 become the optical axis and also become the view field center O.

Therefore, the positions of the observing images are rotated by generally equal amounts about the view field center O by the right and left oculars due to the rotation of the movable housing (see FIG. 6(c)), and the state of the stereoscopic view is not jeopardized.

On the other hand, FIGS. 7(a)-7(d) illustrate the state where the movable housing 4 is rotated by serving the position at the image side of the relay lens 18 as a rotating plane 52'.

Figure 7A:
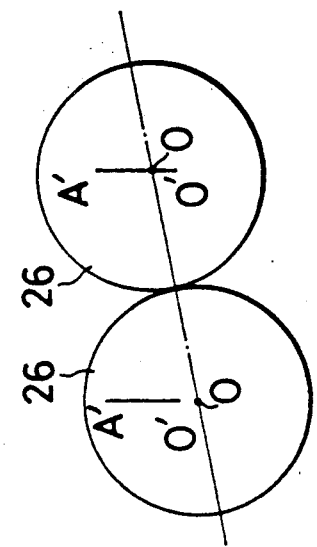
FIGS. 7(a)-7(b) is an illustration showing the state of beam of a rays and observing images when a movable housing is rotated with respect to a stationary housing about a rotating plane positioned on the outlet side of the relays lens.
Figure 7B:
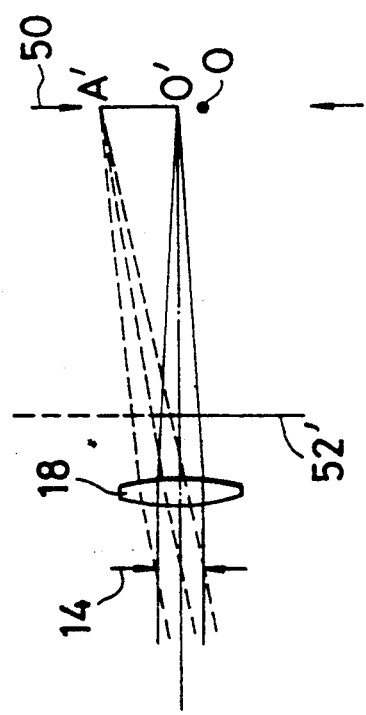

FIG. 7(a) shows the position of the rotating plane 52' and the state of a beam of rays from the relay lens 18 to the imaging position, and FIG. 7(b) shows an observing image through the oculars 26. As apparent from FIGS. 7(a) and 7(b), the observation in this case accompanies the rotation about the center O as well as a parallel movement in the right and left opposite directions.

Therefore, the observing image obtained when the movable housing 4 is rotated is not a fusion image and thus difficult to stereoscopically observe.

When the movable housing 4 is rotation moved, the state of the observing images through the oculars 26 is varied depending on the size of the outgoing pupil at the side of the stationary housing 2 (hereinafter simply referred to as the "outgoing pupil") and that of the incident pupil at the side of the movable housing 4 (hereinafter simply referred to as the "incident pupil") and the space formed therebetween.

The conditions for obtaining images satisfactory for observation by the rotation of the movable housing 4 will be described with reference to FIGS. 8(a)-8(d), 9(a)-9(d), 10(a)-10(d), 11(a)-11(d), and 12(a)-12(d) in which show the state of a beam of rays on the incident plane E' at the side of the movable housing 4 before and after rotation of the movable housing 4, and the state of a beam of rays from the outgoing pupil E at the side of the stationary housing 2 and the incident pupil E' at the side of the movable housing 4 before and after rotation of the movable housing 4 to the images A' and O'.

Figure 8B:
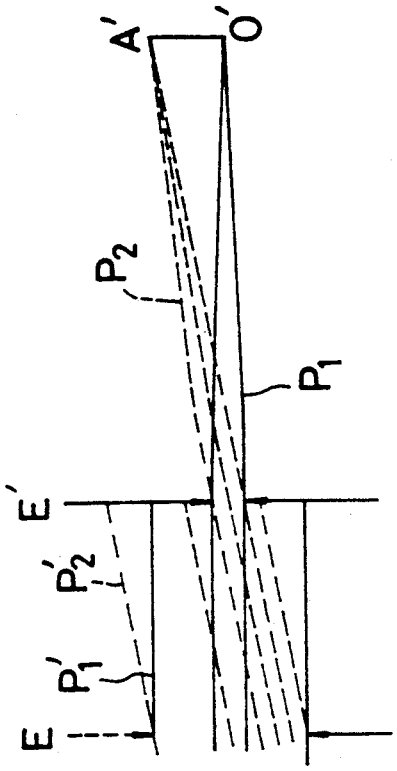
FIGS. 8(a)-8(d) illustrate the state of beam of a rays when an outgoing pupil E at the side of a stationary housing is larger than an incident pupil E' at the side of a movable housing and when the outgoing pupil E is spaced from the incident pupil E'.
Figure 8D:
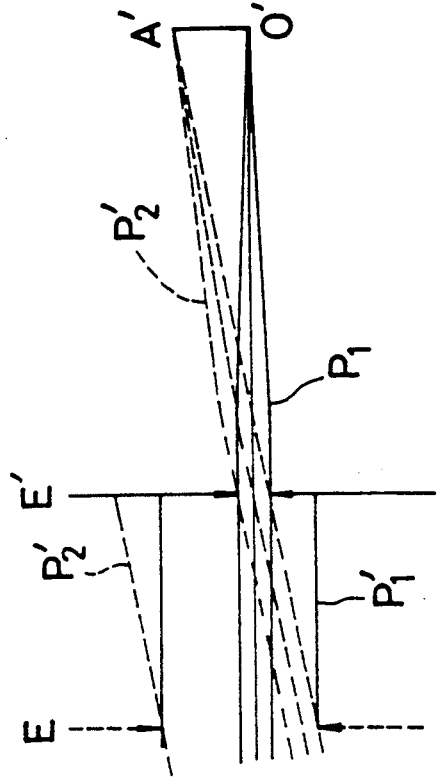
Figure 8A:
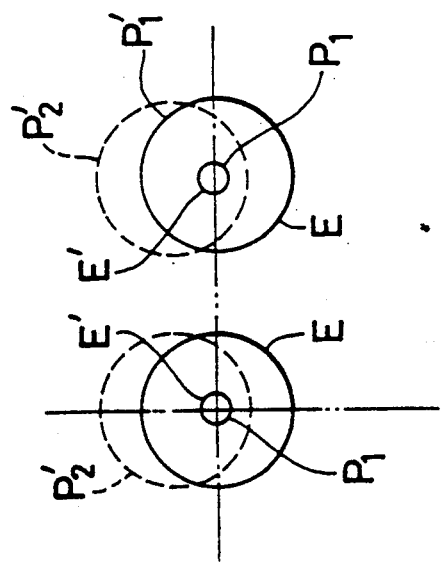

FIGS. 8(a)-(d) shows a case where the outgoing pupil E is larger than the incident pupil E' and the outgoing pupil is spaced from the incident pupil. FIGS. 8(a) and 8(b) show the state of a beam of rays before the rotation of the movable housing 4.

In the figures, the solid line $P_1$ shows a beam of rays converging to a point O', and the broken line $P_2$ shows a beam of rays converging to a point A'.

As shown in the figures, the beam of rays passing through the incident pupil E' of a comparatively small diameter is included in the outgoing pupil E and forms images O' and A'.

Figure 8C:
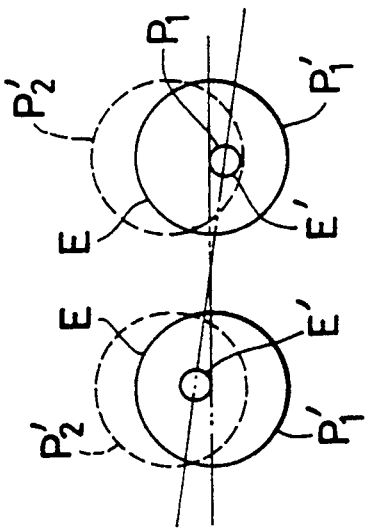

On the other hand, FIGS. 8(c) and (d) show the state of beam of rays after the rotation of the movable housing 4. Even if the movable housing 4 is rotated clockwise in the manner as shown in FIG. 8(c), since the outgoing pupil E at the side of the stationary housing 2 is larger than the incident pupil E' at the side of the movable housing 4, the beam of rays (the beam of rays shown by the broken line in the figures) which passes through the incident pupil E' to contribute in forming an image at the point A', as well as the beam of rays (the beam of rays shown by the solid line in the figures) which contributes in forming an image at the point O', are included in the outgoing pupil E, there can be obtained an image as bright as the observing image before the rotation of the movable housing 4, and the image will not become dark due to the rotation of the movable housing 4. The same is true when the movable housing 4 is rotated counter-clockwise.

FIGS. 9(a)-(d) shows a case which is the same as FIGS. 8(a)-(d) in the respect that the outgoing pupil E is larger than the incident pupil E' but which is different in that the outgoing pupil is formed proximate to the incident pupil. Therefore, although the state of a beam of rays is in the same relation as that of FIGS. 8(a)-(d), there can be obtained an image as bright as an observing image before the rotation of the movable housing 4 even after the rotation of the movable housing 4, even if the outgoing pupil is relatively small.

Figure 10A:
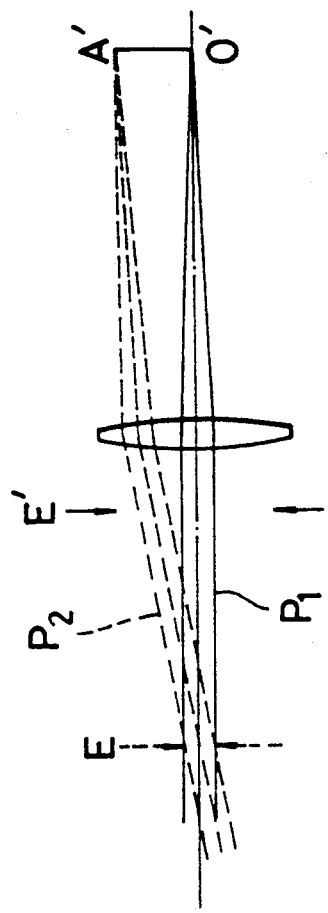
FIGS. 10(a)-10(d) illustrate the state of beam of a rays when an incident pupil E' at the side of a movable housing is larger than an outgoing pupil E at the side of a stationary housing and when the incident pupil is spaced from the incident pupil.
Figure 10B:
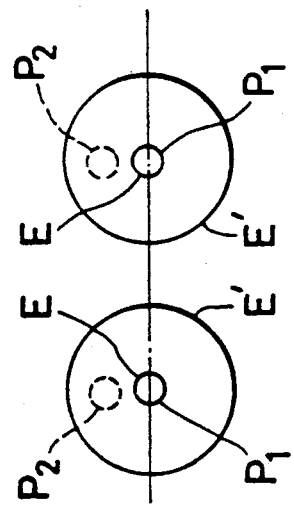

Contrary to the cases of FIGS. 8(a)-(d) and 9(a)-(d), FIGS. 10(a)-(d) show a case in which the incident pupil E' is larger than the outgoing pupil E and the outgoing pupil E is spaced away from the incident pupil E'. FIGS. 10(a) and (b) show the state of a beam of rays before the rotation of the movable housing 4. In the figures, the solid line $P_1$ shows the beam of rays converging to the point O' and the broken line $P_2$ shows the beam of rays converging to the point A'.

As shown in the figures, the beam of rays passing through the outgoing pupil E of a small diameter is included in the incident pupil E' and forms images O' and A'.

Figure 10C:
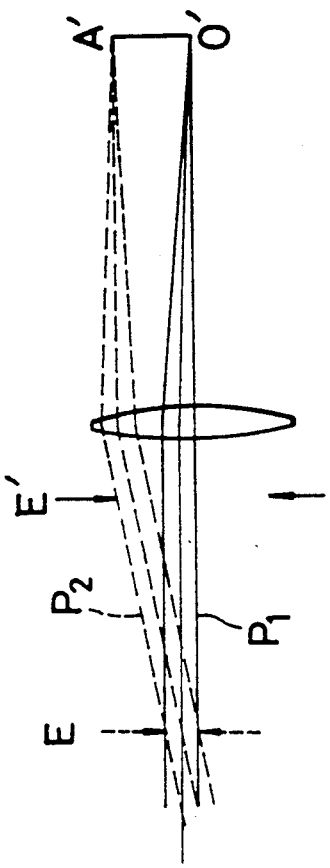
Figure 10D:
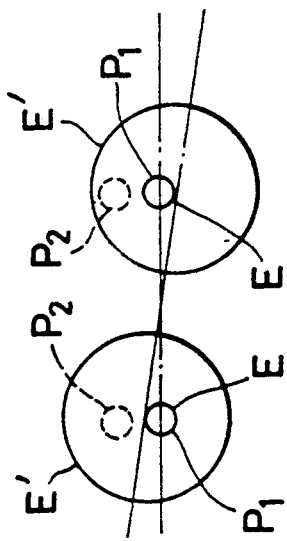
Figure 11A:
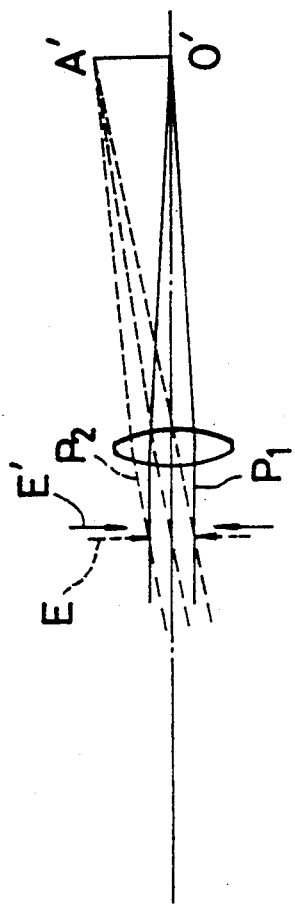
FIGS. 11(a)-11(d) illustrate state of beam of a rays when an incident pupil E' at the side of a movable housing is larger than an outgoing pupil E at the side of a stationary housing and when the incident pupil is proximate to the outgoing pupil.
Figure 11B:
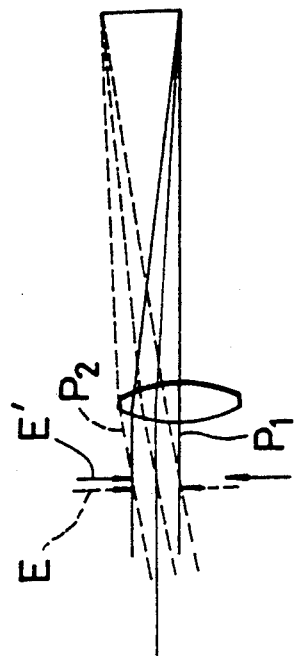
Figure 11C:
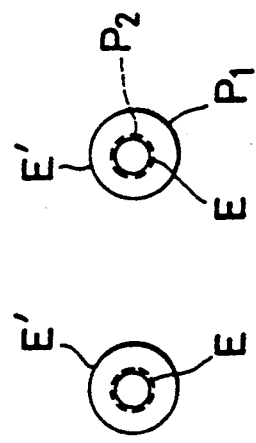
Figure 11D:
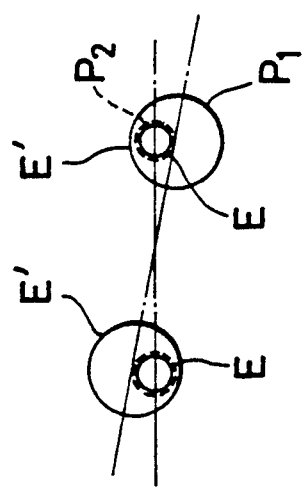

On the other hand, FIGS. 10(c) and (d) show the state of beam of rays after the rotation of the movable housing 4. Even if the movable housing 4 is rotated clockwise as shown in FIG. 10(c), since the incident pupil E' at the side of the movable housing 4 is larger than the outgoing pupil E at the side of the stationary housing 2, the beam of rays (the beam of rays shown by the broken line $P_2$ in the figure) which passes the outgoing pupil E to contribute in forming an image at the point A', as well as the beam of rays (the beam of rays shown by the solid line $P_1$ in the figure) which contributes in forming an image at the point O', are included in the incident pupil E, there can be obtained an image as bright as an observing image before the rotation of the movable housing 4, and the image will not become dark due to the rotation of the movable housing 4. The same is true when the movable housing 4 is rotated counter-clockwise.

FIGS. 11(a)-(d) show a case which is the same as that of FIGS. 10(a)-(d) in the respect that the outgoing pupil E is smaller than the incident pupil E' but which is different in that the outgoing pupil is formed proximate to the incident pupil. Therefore, although the state of the beam of rays is in the relation similar to that of FIGS. 10(a)-(d), there can be obtained an image as bright as an observing image before the rotation of the movable housing 4 even after the rotation of the movable housing 4, even if the incident pupil is comparatively small.

Figure 12A:
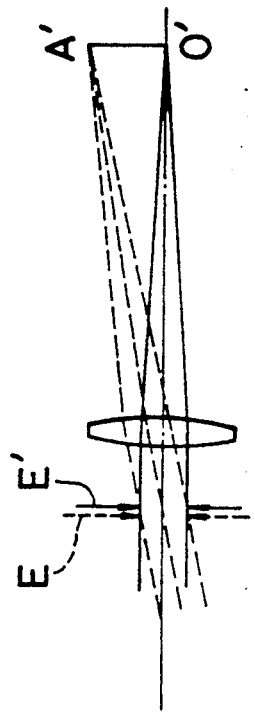
FIGS. 12(a)-12(d) illustrate the state of beam of a rays when an incident pupil E' at the side of a movable housing is generally the same in size as an incident pupil E at the side of a stationary housing and when the incident pupil is proximate to the outgoing pupil.
Figure 12B:
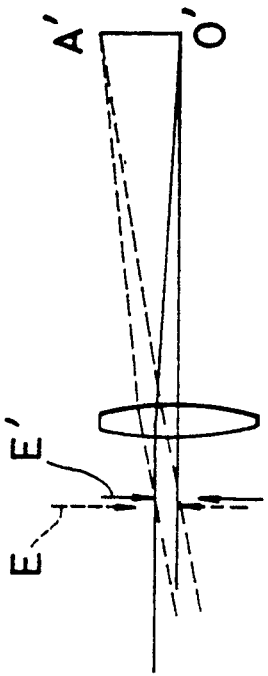

FIGS. 12(a)-12(d) show a case which is suitable when the angle of rotation of the movable housing is small and in which the outgoing pupil E and the incident pupil E' are generally in the same size and generally in the same position. FIGS. 12(a) and 12(b) show the state of beam of rays before the rotation of the movable housing, and the significance of the beam of rays shown by the broken line and the beam of rays shown by the solid line is generally the same as that of FIG. 8. Therefore, the beams of rays, which have passed through the outgoing pupil and the incident pupil, contribute in forming images as shown in the figures.

Figure 12C:
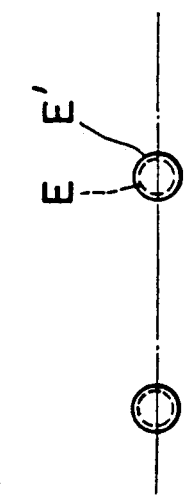
Figure 12D:
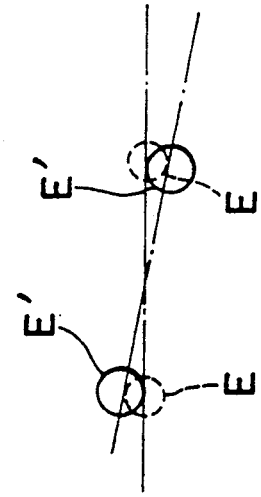

On the other hand, FIGS. 12(c) and 12(d) show the state of a beam of rays after the rotation of the movable housing 4. The beam of rays which contributes in forming an image after the rotation of the movable housing is that which passes through both the outgoing pupil at the side of the stationary housing and the incident pupil at the side of the movable housing as shown in the figures, and the amount thereof is reduced as the movable housing is rotated further.

However, since the darkness of the image is not much recognized even if the observing image becomes darker by about 30%, it may take such constitution as shown in FIG. 12 when such degree of rotation of the movable housing is enough.

In the above-mentioned embodiment, although the means for moving the movable housing is rotatable about the center line which is parallel with the optical axis of the variable power optical system, the present invention is not limited to this embodiment. The present invention is likewise applicable even if the movable housing is linearly moved but within a plane perpendicular to the optical axis.

According to a binocular microscope having the above-mentioned construction, an image will not become darker even if the observing direction is varied by moving the movable housing, and there can be obtained an image which can be stereoscopically observed.

In the event the present invention is to be applied to a binocular microscope having the afore-mentioned variable power optical system, if it is constituted as such that the outgoing pupil at the side of the stationary housing as well as the incident pupil at the side of the movable housing are in either relation shown in FIGS. 8 through 12 at any power, the image will not become darker when the observing direction is varied and a favorable image can be stereoscopically observed.

What is claimed is:

1. A binocular microscope comprising:
   a stationary housing portion;
   a movable housing portion mounted on said stationary housing portion for movement relative to said stationary housing portion;
   objective optical means, disposed in said stationary housing portion, for receiving a bundle of light rays from an object and for emitting said bundle as parallel rays along an objective optical axis;
   variable power optical means, disposed in said stationary housing portion, for receiving and magnifying said parallel rays emitted from said objective optical means;
   relay optical means, disposed in said movable housing portion, for receiving and relaying the light rays from said variable power optical means;
   ocular means, disposed on said movable housing portion, for receiving the light rays from said relay optical means; and
   means for linearly moving said movable housing portion relative to said stationary housing portion in a direction substantially perpendicular to said optical axis of said objective optical means so as to change the angle at which the object is viewed through the ocular means.

2. The binocular microscope according to claim 1, wherein a radius of an outgoing pupil of said stationary housing portion is larger than a radius of an incident pupil of said movable housing portion such that the majority of rays passing through said incident pupil of said movable housing portion which contribute in forming an image within a movable range of said movable housing portion will also pass through said outgoing pupil of the stationary housing portion.

3. The binocular microscope according to claim 2, wherein the outgoing pupil of said stationary housing portion and the incident pupil of said movable housing portion are spaced from one another.

4. The binocular microscope according to claim 2, wherein the outgoing pupil of said stationary housing portion and the incident pupil of said movable housing portion are configured such that the majority of said bundle of rays passing through the outgoing pupil to contribute in forming an image also enter into the incident pupil at any power.

5. The binocular microscope according to claim 1, wherein a radius of an incident pupil of said movable housing portion is larger than a radius of an outgoing pupil of said stationary housing portion such that the majority of said bundle of rays passing through the outgoing pupil of said stationary housing which contribute in forming an image within a movable range of said movable housing portion will also pass through said incident pupil of said movable housing portion.

6. The binocular microscope according to claim 5, wherein the outgoing pupil of said stationary housing portion and the incident pupil of said movable housing portion are spaced from one another.

7. The binocular microscope according to claim 5, wherein the outgoing pupil of said stationary housing portion and the incident pupil of said movable housing portion are configured such that the majority of said bundle of rays, passing through the outgoing pupil to contribute in forming an image also enter into the incident pupil at any power.

8. The binocular microscope according to claim 1, wherein the movable range of said movable housing portion is limited such that the majority of said bundle of rays which pass through the outgoing pupil of said stationary housing portion to contribute in forming an image will also pass through the incident pupil of said movable housing portion.

9. The binocular microscope of claim 1 wherein said variable power optical means comprises a pair of variable power lens systems, said relay optical means comprises a pair of relay lenses aligned with respective ones of said pair of variable power lens systems, and said ocular means comprises a pair of eyepieces aligned with respective ones of said pair of variable power lens systems.

* * * * *